March 6, 1962
L. G. DEAN ETAL
3,024,091
DIBORANE MANUFACTURE
Filed April 1, 1958
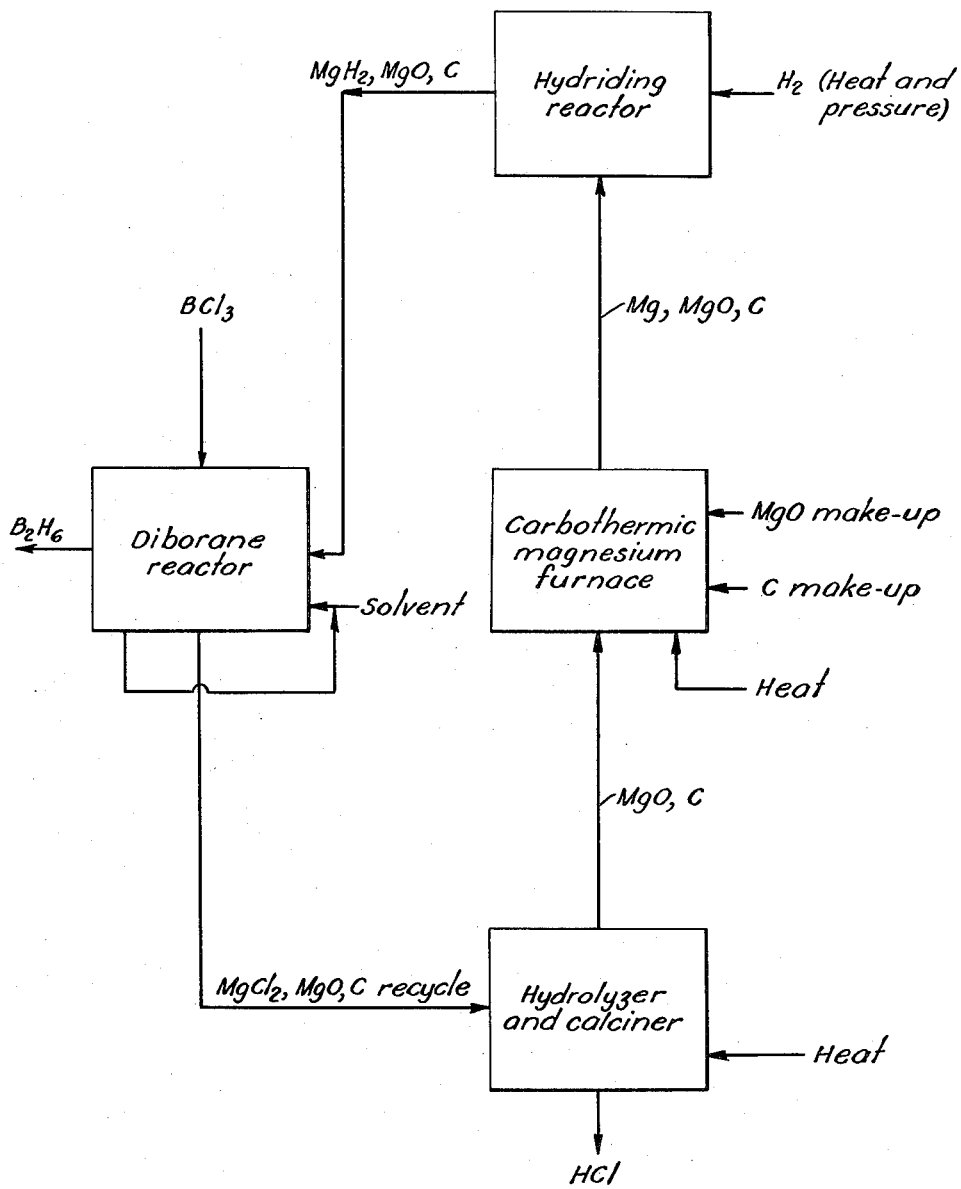
INVENTORS.
Lloyd G. Dean
Charles W. McCutchen
Arthur C. Doumas
BY James B. Vander Veld
ATTORNEY

United States Patent Office 3,024,091
Patented Mar. 6, 1962

3,024,091
DIBORANE MANUFACTURE
Lloyd G. Dean, Charles W. McCutcheon, and Arthur C. Doumas, Lake Jackson, Tex., assignors to The Dow Chemical Company, Midland, Mich., a corporation of Delaware
Filed Apr. 1, 1958, Ser. No. 725,669
5 Claims. (Cl. 23—204)

This invention relates to a method of preparing diborane and is more particularly concerned with a method of preparing diborane which includes a recycling procedure involving carbothermic magnesium.

The preparation of diborane is usually accomplished by the reaction of boron trichloride with the hydride or borohydride of a metal such as sodium, lithium, or magnesium. The reaction products of such a procedure usually include the corresponding metallic chloride, which, in proposed cyclic procedures was designed to be electrolytically reduced in a typical electrolytic metal cell, however, the presence of minute amounts of boron in the metallic chlorides has led to substantial difficulties in obtaining satisfactory electrolytic cell operation. Thus, the cost of the diborane necessarily included the cost of the metal hydride or borohydride provided, since recycling of the metal chloride into an electrolytic cell for conversion back to the free metal was economically unfeasible.

It is, therefore, a principal object of the present invention to provide a cyclic process for the preparation of diboranes, which includes, except for make-up quantities of materials, the requirement only of heat, pressure, boron trichloride, hydrogen and carbon with substantially the only products being diborane, hydrochloric acid and carbon monoxide. Still a further object of the present invention is to provide an economic process for the preparation of diborane. Another object of the present invention is to provide a process for the preparation of diborane which utilizes magnesium hydride prepared from carbothermic magnesium reacted with boron trichloride, the separation of diborane, and the treatment of the diborane reaction products to prepare magnesium oxide suitable for the carbothermic magnesium process. Another object of the present invention is to provide a cyclic process for the preparation of diborane which maintains a substantially constant quantity of magnesium continuously in circulation. Still another object of the present invention is to provide a cyclic process for the preparation of diborane which utilizes as input materials, except for make-up, hydrogen, boron trichloride and carbon, the products of said cyclic process being diborane, hydrogen chloride, and carbon monoxide. Other objects will become apparent hereinafter.

Although this invention is particularly described as a process to produce diborane, by varying the mole ratio of reactants, either chlorinated diborane or magnesium borohydride may be produced. The higher molecular weight boranes may also be produced by either reacting the magnesium hydride and boron trichloride at higher temperatures or by a subsequent diborane pyrolysis step.

The cyclic process is generally illustrated in the accompanying flow sheet.

The foregoing and additional objects have been accomplished by preparing magnesium from magnesium oxide and carbon in the carbothermic magnesium process, hydriding the resulting magnesium to provide magnesium hydride, reacting the resulting magnesium hydride with a boron trihalide in the presence of an aluminum trihalide, thereby to provide diborane and magnesium chloride, hydrolyzing and calcining the magnesium chloride to magnesium oxide and recycling the resulting magnesium oxide to the carbothermic magnesium process.

The preparation of magnesium by the carbothermic reduction of magnesium oxide has been extensively investigated as a potential method of preparing magnesium. However, because of the presence of carbon and magnesium oxide in the resulting product, notwithstanding extensive research designed to eliminate these impurities, carbothermic magnesium has not had wide application for the general magnesium uses. Carbothermic magnesium may be prepared by reacting magnesium oxide and carbon, at temperatures in excess of 1800° C. and pressures at 1 atmosphere to produce gaseous magnesium and gaseous carbon monoxide. To avoid a reversion of the reduction to carbon and magnesium oxide that occurs on slow cooling, a rapid quench technique utilizing methane, hydrogen, fuel oil, etc. gases is employed to prepare a solid product consisting of approximately 52 percent magnesium, 11 percent carbon and 37 percent magnesium oxide. Since the carbon and magnesium oxide impurities do not affect the subsequent series of reactions, the difficult separation of these impurities is not required and the reaction product may be used directly in the hydriding step.

The preparation of magnesium hydride has been described by Ellinger et al., Journal of American Chemical Society, volume 77, page 2647, and usually employs a high temperature and high pressure reaction of magnesium with hydrogen. The pressure is usually 1000 p.s.i. or above and the temperature in excess of 450° C. Thereby, a conversion of magnesium to magnesium hydride in excess of 90 percent is obtained. Other temperatures and pressures may be employed, as desired. The reaction time and completeness of the reaction will be dependent upon the conditions of the reaction, although at a pressure of 1500 p.s.i. and a temperature of 470° C., conversion of magnesium to magnesium hydride in excess of 90 percent is achieved. The carbon and magnesium oxide are relatively unaffected by this step. The resulting magnesium hydride is used directly in the next step for the preparation of diborane.

In an application filed by Yates and Doumas, Serial No. 734,097, filed May 9, 1958, there is described a method of preparing diborane by the reaction of magnesium hydride with a boron trihalide in the presence of aluminum trihalide. This reaction utilizes either boron trichloride or boron tribromide in the presence of aluminum trichloride or aluminum tribromide and in the presence of an anhydrous solvent, by contacting the materials in an agitated reactor, for example, a ball mill reactor, at temperatures from as low as $-10°$ C. to the boiling point of the particular solvent used. The reactor may be a pressure-type reactor whereby the gaseous diborane may be collected, or it may be a low pressure reactor from which the diborane is continuously removed.

In the reaction of magnesium hydride with boron trichloride in the presence of aluminum trichloride, three reactions are possible:

(1)   $2BCl_3 + 3MgH_2 \rightarrow B_2H_6 + 3MgCl_2$
(2)   $2BCl_3 + 4MgH_2 \rightarrow Mg(BH_4)_2 + 3MgCl_2$
(3)   $2BCl_3 + 2MgH_2 \rightarrow B_2H_4Cl_2 + 2MgCl_2$ As will be noted from the above equations, by utilizing three moles of magnesium hydride and two moles of boron trichloride, the principal reaction product will be diborane. If this mole ratio is varied to provide an excess of magnesium hydride, an increase in the amount of magnesium borohydride prepared is accomplished whereas, an excess of boron trichloride will result in an increased amount of chlorinated diborane formation. Therefore, while ½ mole to 3 moles of magnesium hydride per mole of boron trichloride may be employed, preferably, 1.25 moles to 1.75 moles of magnesium hydride, and desirably, 1.5 moles of magnesium hydride per mole of boron trichloride will be provided. The presence of aluminum trihalide, i.e., aluminum trichloride or aluminum tribromide, results in a more rapid reaction with higher yields of the desired diborane. The mole ratio of aluminum chloride to magnesium hydride should be at least 0.02 and preferably at least 0.15 mole of aluminum trihalide per mole of magnesium hydride. Anhydrous solvents which may be employed include, for example, benzene, ethylbenzene, diethylbenzene, hexane, pentane, heptane, diethyl ether, dipropyl ether, etc. Thus, the solvent need not be a solvent for the reactants employed, but the materials should be dispersible therein. Because of the reactivity of the boron trichloride and magnesium hydride with water, the materials are preferably employed in an anhydrous condition. The reaction temperature for the magnesium hydride-boron trichloride reaction may be from $-10°$ C. to approximately $200°$ C., preferably from 0 to $50°$ C. Near $200°$ C. diborane is thermally rearranged to form the higher molecular weight boranes such as deca- and penta-boranes. Pressures below 400 p.s.i. have not shown an adverse effect, and while the reactor is normally loaded at atmospheric pressure, a pressure build-up from the reaction may occur, the magnitude of which depends on the pressure at which it is desired to remove the product. A reactor vessel is usually employed in a method such that agitation of the reactants may be achieved, either by use of a stirred reactor or a ball mill reactor. Separation of the diborane is readily accomplished by collecting gaseous products of the reaction and separating the diborane therefrom in a conventional manner.

Removal of the solvent from the diborane liquid reaction product results in a mixture of the reversion products of the carbothermic furnace (magnesium oxide and carbon), and the $MgCl_2$ formed by the diborane reaction. This mixture may be hydrolyzed in a conventional manner with water and heated (30 to about $200°$ C., preferably near $200°$ C.) to convert the contained $MgCl_2$ to MgOHCl which may be calcined with heat ($300-1000°$ C., preferably $800-850°$ C.) to magnesium oxide. This magnesium oxide may be recycled, thereby serving as feed for the carbothermic magnesium process.

Thus, there is provided a cyclic procedure utilizing carbothermic magnesium for the preparation of diborane. The hydrogen chloride removed from the calcining and hydrolyzation steps is an economically important by-product. It will be noted that the magnesium content of the overall cyclic procedure remains substantially constant while the only input materials besides the energy requirements of heat and pressure are hydrogen, boron trihalide, water and carbon.

The following examples are given to illustrate the process of the present invention but are not to be construed as limiting the invention thereto.

*Example 1*

A mixture of magnesium oxide and carbon was heated to $2000°$ C. under atmospheric pressure and the gases therefrom shock-cooled with methane. Shock-cooling was employed to prevent the reversion of the magnesium and carbon monoxide to magnesium oxide and carbon which occurs when slow cooling is used. By such shock-cooling, a conversion efficiency of 64.4 percent of magnesium oxide to magnesium was achieved, the resulting product containing 32.5 percent magnesium, 29.9 percent magnesium oxide and 21.5 percent carbon.

The carbothermic furnace product was hydrided by the direct reaction of hydrogen gas with said product at a pressure of 1500 p.s.i. and a temperature of $470°$ C. A magnesium to magnesium hydride conversion efficiency of 93.3 percent was thereby achieved.

The carbothermic magnesium hydride product prepared as above, in an amount corresponding to 3.5 parts of pure magnesium hydride, and 18 parts of anhydrous aluminum chloride were charged into a stainless steel ball mill reactor. The reactor was evacuated and back-filled with 10 parts of anhydrous boron trichloride and 30 parts of anhydrous n-hexane. The ball mill reactor was rotated for a period of 16.4 hours and maintained at a temperature of $25°$ C. At the end of this time, the gas phase in the reactor contained a substantial proportion of diborane. The conversion was 53 percent, based on the magnesium hydride utilization.

Approximately 15 parts of magnesium chloride are produced for each part of diborane prepared. This magnesium chloride, along with the magnesium oxide and carbon introduced with the carbothermic magnesium hydride is contained in the solvent phase of the diborane reactor. Removal of the solvent is accomplished by heating, and the resulting solid products placed in steam maintained at a temperature of $300°$ C. whereby the magnesium chloride is converted to magnesium oxide and hydrogen chloride. The hydrogen chloride is separated in the conventional manner and the magnesium oxide and carbon utilized in a subsequent cycle of the process by introduction into the carbothermic magnesium reactor.

Various modifications may be made in the cyclic process of the present invention without departing from the spirit or scope thereof and it is to be understood that we limit ourselves only as defined in the appended claims.

We claim:

1. A cyclic process for the preparation of diborane which includes: providing carbothermic magnesium with its normally associated impurities, said magnesium being prepared by reacting magnesium oxide with carbon at a temperature above about $1800°$ C.; hydriding said carbothermic magnesium with its normally associated impurities by reacting said carbothermic magnesium with hydrogen at an elevated temperature of greater than about $450°$ C. and an elevated pressure of greater than about 1000 pounds per square inch; reacting the resulting magnesium hydride with boron trichloride by contacting the reactants in the presence of an anhydrous solvent and aluminum trihalide, said solvent being a member selected from the group consisting of aliphatic hydrocarbons, aromatic hydrocarbons, alkyl substituted aromatic hydrocarbons and ethers; recovering the diborane thus prepared; passing the remaining reaction products to a hydrolyzer wherein the magnesium chloride is hydrolyzed by reacting said chloride with water at a temperature of from $30°$ to about $100°$ C.; calcining the hydrolyzed magnesium chloride to magnesium oxide in a calciner at a temperature of from about 300 to about $1000°$ C.; and, recycling the resulting magnesium oxide to a subsequent carbothermic magnesium process utilizing carbon as a reductant.

2. A cyclic process for the preparation of diborane which includes; providing carbothermic magnesium with its normally associated impurities, said magnesium being prepared by reacting magnesium oxide with carbon at a temperature above about $1800°$ C.; hydriding said carbothermic magnesium with its normally associated impurities by reacting said carbothermic magnesium with hydrogen at an elevated temperature of greater than about $450°$ C. and an elevated pressure of greater than about 1000 pounds per square inch; reacting the resulting magnesium hydride with boron trichloride by contacting the reactants in the presence of an anhydrous solvent and aluminum trihalide, said solvent being a member selected from the group consisting of aliphatic hydrocarbons, aromatic hydrocarbons, alkyl substituted aromatic hydrocarbons and ethers; recovering the diborane thus prepared; passing the remaining reaction products to a hydrolyzer wherein the magnesium chloride is hydrolyzed with water at a temperature of about $200°$ C.; calcining said hydrolyzed magnesium chloride to magnesium oxide in a calciner at a temperature of from about 800 to about 850° C.; and, recycling the resulting magnesium oxide to a subsequent carbothermic magnesium process utilizing carbon as a reductant.

3. A cyclic process for the preparation of diborane which includes: providing carbothermic magnesium with its normally associated impurities, said magnesium being prepared by reacting magnesium oxide with carbon at a temperature above about 1800° C.; hydriding said carbothermic magnesium with its normally associated impurities by reacting said carbothermic magnesium with hydrogen at an elevated temperature of greater than about 450° C. and an elevated pressure of greater than about 1000 pounds per square inch; reacting the resulting magnesium hydride with boron trichloride by contacting the reactants in the presence of an anhydrous solvent and aluminum trichloride, said solvent being a member selected from the group consisting of aliphatic hydrocarbons, aromatic hydrocarbons, alkyl substituted aromatic hydrocarbons and ethers; recovering the diborane thus prepared; separating the solvent from the reaction mixture; passing the remaining reaction products to a hydrolyzer wherein the magnesium chloride is hydrolyzed by reacting said chloride with water at a temperature of from 30° to about 200° C.; calcining the hydrolyzed magnesium chloride to magnesium oxide in a calciner at a temperature of from about 300 to about 1000° C.; and, recycling the resulting magnesium oxide to a subsequent carbothermic magnesium process utilizing carbon as a reductant.

4. A cyclic process for the preparation of diborane which includes: providing carbothermic magnesium with its normally association impurities, said magnesium being prepared by reacting magnesium oxide with carbon at a temperature above about 1800° C.; hydriding said carbothermic magnesium with its normally associated impurities by reacting said carbothermic magnesium with hydrogen at an elevated temperature of greater than about 450° C. and an elevated pressure of greater than about 1000 pounds per square inch; reacting the resulting magnesium hydride with boron trichloride by contacting the reactants in the presence of an anhydrous solvent and aluminum trichloride, said solvent being a member selected from the group consisting of aliphatic hydrocarbons, aromatic hydrocarbons, alkyl substituted aromatic hydrocarbons and ethers; recovering the diborane thus prepared; passing the remaining reaction products to a hydrolyzer wherein the magnesium chloride is hydrolyzed by reacting with water at a temperature of from 30° C. to about 200° C.; calcining the hydrolyzed magnesium chloride to magnesium oxide in a calciner at a temperature of from about 300 to about 1000° C.; and, recycling the resulting magnesium oxide together with make-up magnesium oxide and carbon to a subsequent carbothermic magnesium process.

5. A cyclic process for the preparation of diborane which includes: providing carbothermic magnesium with its normally associated impurities; said magnesium being prepared by reacting magnesium oxide with carbon at a temperature above about 1800° C.; hydriding said carbothermic magnesium with its normally associated impurities by reacting said carbothermic magnesium with hydrogen at an elevated temperature of greater than about 450° C. and an elevated pressure of greater than about 1000 pounds per square inch; reacting the resulting magnesium hydride with boron trichloride by contacting the reactants in the presence of an anhydrous solvent and aluminum trichloride, said solvent being a member selected from the group consisting of aliphatic hydrocarbons, aromatic hydrocarbons, alkyl substituted aromatic hydrocarbons and ethers; recovering the diborane thus prepared; separating the anhydrous solvent and recycling said solvent to a subsequent boron trichloride-magnesium hydride reaction; passing the remaining reaction products to a hydrolyzer wherein the magnesium chloride is hydrolyzed by reacting with water at a temperature of from 30° C. to about 200° C.; calcining the hydrolyzed magnesium chloride to magnesium oxide in a calciner at a temperature of from about 300 to about 1000° C.; and and recycling the resulting magnesium oxide to a subsequent carbothermic magnesium process utilizing carbon as a reductant thereby to provide a cyclic process for the preparation of diborane.

References Cited in the file of this patent

FOREIGN PATENTS 193,131    Switzerland _____ Dec. 16, 1937

OTHER REFERENCES

Schechter et al.: "Boron Hydrides and Related Compounds," prepared under Contract NOa(s) 10992 for Dept. of Navy, Bureau of Aeronautics, prepared by Callery Chemical Co., printed March 1951, declassified December 1953, pages 29 and 30.

Schlesinger et al.: "Boron Hydrides, Final Report on Contract 178s–10421, Naval Research Laboratory Report No. P2964, printed July 1946, declass. May 7, 1947, Progress Report No. XIII, pages 1 and 2.

Wiberg: "New Results in Preparative Hydride Research," AEC–tr–1931 (published by U.S. Atomic Energy Commission), Apr. 8, 1954, page 1315.

Latimer et al.: "Reference Book of Inorganic Chemistry," 3rd edition, 1951, pages 60, 61, 66.